United States Patent
Riedinger et al.

(10) Patent No.: US 8,942,923 B2
(45) Date of Patent: Jan. 27, 2015

(54) METHOD OF DETERMINING NAVIGATION PARAMETERS FOR A CARRIER AND HYBRIDIZATION DEVICE

(75) Inventors: Didier Riedinger, Paris (FR); Houcine Chafouk, Bois Guillaume (FR)

(73) Assignee: Sagem Defense Securite, Paris (FR)

( * ) Notice: Subject to any disclaimer, the term of this patent is extended or adjusted under 35 U.S.C. 154(b) by 383 days.

(21) Appl. No.: 13/383,202
(22) PCT Filed: Jul. 9, 2010
(86) PCT No.: PCT/EP2010/059853
§ 371 (c)(1),
(2), (4) Date: Jan. 9, 2012
(87) PCT Pub. No.: WO2011/003993
PCT Pub. Date: Jan. 13, 2011

(65) Prior Publication Data
US 2012/0123679 A1    May 17, 2012

(30) Foreign Application Priority Data
Jul. 10, 2009  (FR) ..................................... 09 54850

(51) Int. Cl.
*G01C 21/00*     (2006.01)
*G01C 21/16*     (2006.01)
(Continued)

(52) U.S. Cl.
CPC ............... *G01C 21/165* (2013.01); *G01S 19/40* (2013.01); *G01S 19/47* (2013.01)
USPC ................. 701/480; 701/3; 701/14; 701/408; 701/472; 701/470; 342/357.56; 342/357.59; 342/357.65

(58) Field of Classification Search
CPC ........... G01S 19/47; G01S 19/20; G01S 1/24; G01S 5/0263; G01S 5/10; G01S 19/10; G01S 19/18; G01S 19/52; G01S 5/0027; G01S 21/165; G01S 21/206; G01C 21/3691; G01C 21/16; G01C 21/005
USPC ......... 701/472, 469, 470, 501, 532, 119, 3, 4, 701/408, 14, 16; 342/62, 63, 64, 357.53, 342/357.56, 357.59, 357.65
See application file for complete search history.

(56) References Cited

U.S. PATENT DOCUMENTS 5,583,774 A * 12/1996 Diesel ........................... 701/536
5,923,286 A * 7/1999 Divakaruni .............. 342/357.44
(Continued)

FOREIGN PATENT DOCUMENTS

EP            1752786       2/2007
WO     WO 2008/040658     4/2008

OTHER PUBLICATIONS

Curt Call et al., Performance of Honeywell's Inertial/GPS Hybrid (HIGH) for RNP Operations, Position, Location,and Navigation Symposium, 2006 IEEE/ION Coronado, CA, Apr. 25-27, 2006, Piscataway, NJ, USA, IEEE, Apr. 25, 2006, p. 244.

(Continued)

*Primary Examiner* — John R Olszewski
*Assistant Examiner* — Truc M Do
(74) *Attorney, Agent, or Firm* — Blakely Sokoloff Taylor & Zafman

(57) ABSTRACT

Method of determining navigation parameters for a carrier by a hybridization device comprising a Kalman filter (3) formulating a hybrid navigation solution on the basis of inertial measurements calculated by a virtual platform (2) and of raw measurements of signals emitted by a constellation of satellites delivered by a satellite positioning system (GNSS), characterized in that it comprises, the steps of: —determination, for each satellite, of at least one likelihood ratio (Ir, Ir') between a hypothesis regarding a fault of a given nature of the satellite and a hypothesis regarding an absence of fault of the satellite, —declaration, of a fault of a given nature on a satellite as a function of the likelihood ratio (Ir, Ir') associated with this fault and of a threshold value, —estimation of the impact of the declared fault on the hybrid navigation solution, and ☐correction of the hybrid navigation solution as a function of the estimation of the impact of the declared fault.

14 Claims, 1 Drawing Sheet

(51) Int. Cl.
  *G01S 19/40* (2010.01)
  *G01S 19/47* (2010.01)

(56) References Cited

U.S. PATENT DOCUMENTS

| | | | |
|---|---|---|---|
| 6,417,802 B1* | 7/2002 | Diesel | 342/357.31 |
| 6,982,669 B2* | 1/2006 | Coatantiec et al. | 342/357.62 |
| 7,409,289 B2* | 8/2008 | Coatantiec et al. | 701/472 |
| 7,711,482 B2* | 5/2010 | Coatantiec et al. | 701/476 |
| 8,160,123 B2* | 4/2012 | Martin et al. | 375/149 |
| 8,311,728 B2* | 11/2012 | Coatantiec et al. | 701/472 |
| 2001/0020216 A1* | 9/2001 | Lin | 701/216 |
| 2002/0109628 A1* | 8/2002 | Diesel | 342/357.14 |
| 2003/0028340 A1* | 2/2003 | Brunstein | 702/94 |
| 2003/0149528 A1* | 8/2003 | Lin | 701/214 |
| 2004/0239560 A1* | 12/2004 | Coatantiec et al. | 342/357.14 |
| 2004/0267444 A1* | 12/2004 | Coatantiec et al. | 701/202 |
| 2007/0156338 A1* | 7/2007 | Coatantiec et al. | 701/214 |
| 2008/0243383 A1* | 10/2008 | Lin | 701/213 |
| 2009/0182493 A1* | 7/2009 | McDonald et al. | 701/200 |
| 2009/0182494 A1* | 7/2009 | McDonald et al. | 701/200 |
| 2010/0026567 A1* | 2/2010 | Coatantiec et al. | 342/357.04 |
| 2010/0211316 A1* | 8/2010 | Da Silva et al. | 701/216 |
| 2010/0324822 A1* | 12/2010 | Coatantiec et al. | 701/216 |
| 2011/0084874 A1* | 4/2011 | Coatantiec | 342/357.3 |

OTHER PUBLICATIONS

Stefan Vieweg, Integrity Monitoring and Failure Identification within an Integrated Satellite-/Inertial Navigation System, Position Location and Navigation Symposium, IEEE Las Vegas, NV, USA, Apr. 11-15, 1994, New York, NY, USA, IEEE, Apr. 11, 1994, pp. 755-761.

* cited by examiner

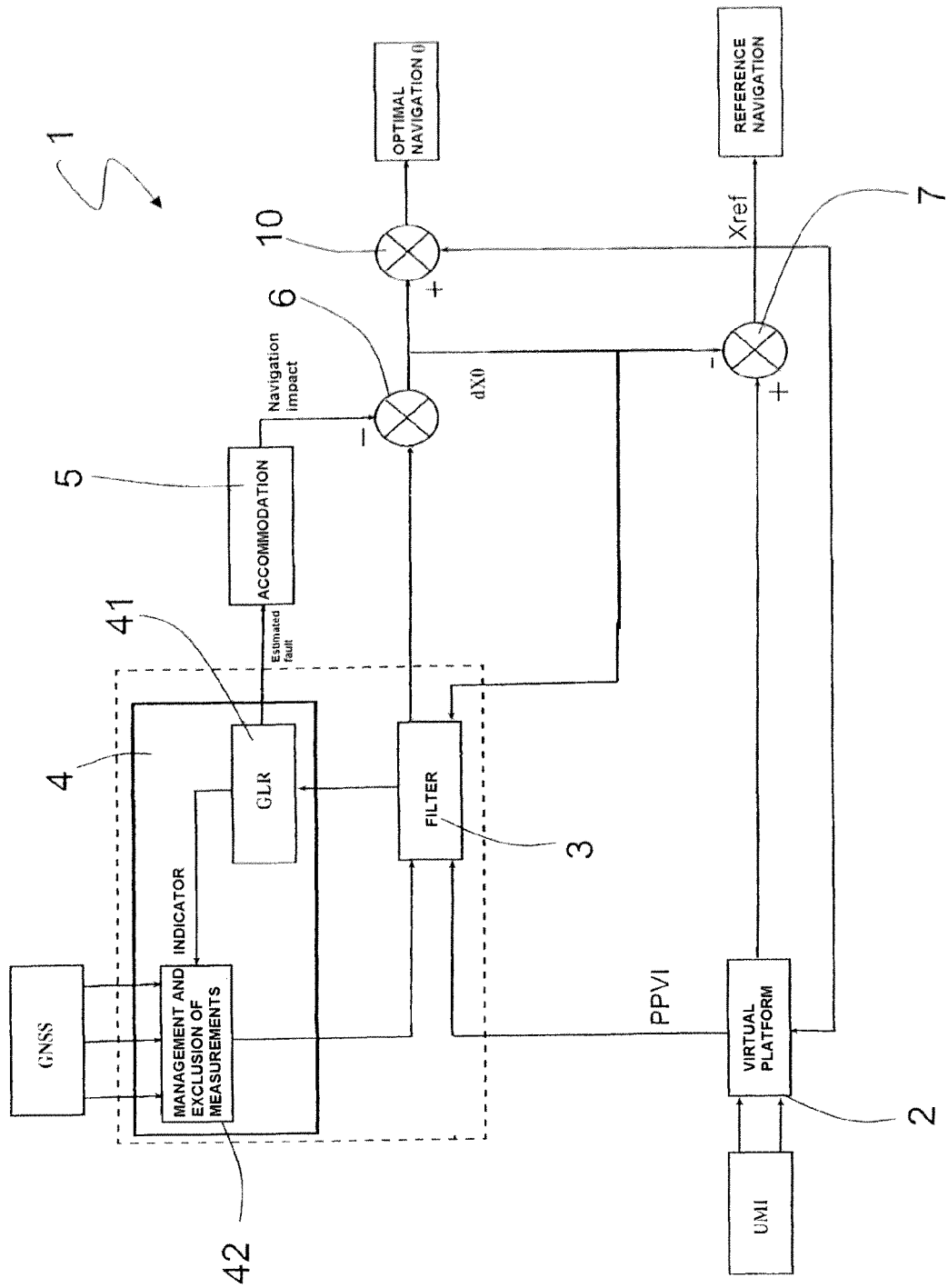

METHOD OF DETERMINING NAVIGATION PARAMETERS FOR A CARRIER AND HYBRIDIZATION DEVICE

This is a non-provisional application claiming the benefit of International Application Number PCT/EP2010/059853 filed Jul. 9, 2010.

GENERAL TECHNICAL FIELD

The field of the invention is that of carriers using information provided both by an inertial unit and by a satellite navigation system, such as for example a GPS system.

The invention relates to a process and a hybridisation device, and more particularly relates to the detection of satellite breakdowns and the correction of the impact of such breakdowns.

PRIOR ART

Carriers such as aircraft or even ships have numerous navigation systems. Examples of these systems especially are INS/GNSS hybrid equipment (from English "Inertial Navigation System" and "Global Navigation Satellite System").

An inertial unit provides low-noise information which is precise in the short term. However, in the long term, location performance of an inertial unit degrades (more or less quickly as a function of the quality of sensors, accelerometers or gyroscopes for example, and processing used by the unit). If the information acquired from a satellite navigation system is as such highly unlikely to drift over the long term, it is often noisy however and varies in its precision. Also, inertial measurements are always available whereas GNSS information is not or is likely to be misled and scrambled.

Hybridisation consists of combining the information supplied by the inertial unit and the measurements provided by the satellite navigation systems to obtain information on position and speed by benefiting from both systems. In this way, the precision of measurements provided by the GNSS receiver controls the inertial drift and the low-noise inertial measurements filter the noise on the measurements of the GNSS receiver.

Modern navigation systems calculate protection beams around the calculated position which contain the position error true to a given risk of integrity, and this is what defines the integrity of a system.

According to the prior art, these protection beams can be calculated, for example, using a bank of Kalman filters which are protected against potential satellite breakdown.

These filters execute hybridisation between information coming from the satellite navigation system and that coming from the inertial unit. One of the filters of the bank of filters, designated by the term principal filter, utilises all the GNSS measurements made up of pseudo-measurements and information on the quality of the latter. The other filters, known as secondary, of the bank of filters make use of only part of the available GNSS measurements, If a breakdown occurs at the level of a satellite measurement, the latter will not be seen by the secondary filter not receiving this measurement: this secondary filter will therefore remain uncontaminated.

Using such a bank of Kalman filters was proposed in document U.S. Pat. No. 7,219,013, according to which the protection beams are calculated using the separation solution method, whereas detection and exclusion of a satellite breakdown utilise surveillance of innovation residue of Kalman filters.

However, this architecture does not isolate breakdowns caused by weak drifts, such that it proves necessary to complete surveillance of innovation residue by a method called least-squares method using GNSS information only.

The applicant has developed devices using such a bank of filters, an example of which is presented in its patent application FR 0858726 filed on Dec. 17, 2008.

The architecture proposed in this application has a bank of Kalman filters, in which each filter is associated with a correction module for GNSS measurements at the input of the filter as a function of its output. The hybrid navigation solution is determined by correction of the inertial state as a function of the outputs of the filters of the bank of filters.

However, the architecture proposed in this document does not prove to be totally satisfactory. If it permits detection of a breakdown and exclusion of measurements coming from the identified satellite in breakdown, it proposes no solution for evaluating the impact of the breakdown on the navigation solution. In fact, detection is based on an instantaneous statistical test which is triggered only when the breakdown reaches a detection threshold. In this way, even if the satellite in breakdown has been isolated, the navigation solution cannot be corrected and a residual error persists originating from data corrupted by the breakdown prior to their identification. Because of this, the protection beam significantly increases in case of satellite breakdown, even though the latter is detected.

Also, such architectures fail to distinguish the type of a breakdown, bias or ramp in particular, but only declare the presence of one of these breakdowns.

In addition, no detection period is restricted, and nothing indicates that the hybrid solution is at any given moment corrupted by a breakdown which will be detected next,

PRESENTATION OF THE INVENTION

The invention proposes eliminating at least one of these disadvantages and aims in particular at reducing the protection beam in the event of satellite breakdown.

To this effect, the invention proposes according to a first aspect a process for determination of navigation parameters of a carrier by a hybridisation device comprising a Kalman filter working out a hybrid navigation solution from inertial measurements calculated by a virtual platform and raw measurements of signals emitted by a constellation of satellites delivered by a satellite-positioning system (GNSS), comprising the steps of:

determination, for each satellite, of at least one probability ratio between a hypothetical breakdown of a given type of the satellite and a hypothetical absence of breakdown of the satellite, declaration of a breakdown of given type on a satellite as a function of the probability ratio associated with this breakdown and of a threshold value, estimation of the impact of the declared breakdown on the hybrid navigation solution, and correction of the hybrid navigation solution as a function of the estimation of the impact of the declared breakdown.

The process according to the first aspect of the invention is advantageously completed by the following characteristics, taken singly or in any one of their technically possible combinations:

for each satellite, at least one probability ratio is determined at each incrementation of the Kalman filter on a sliding storage window, a breakdown of given type being declared if the sum of the probability ratios associated with this breakdown is greater than the associated threshold value, if a breakdown is declared, the process also comprises a step of exclusion of the raw measurements of signals emitted by the satellite declared in breakdown, the probability ratio is determined as a function of an innovation vector and of innovation covariances provided by the Kalman filter and from estimation of the impact of the breakdown of given type on said innovation vector, the impact of the breakdown of given type on said innovation is estimated by determination, from data provided by the Kalman filter, of a dynamic innovation matrix, and estimation of an amplitude of the breakdown of given type on a sliding estimation window corresponding to a given number of incrementations of the Kalman filter, the dynamic innovation matrix representing a link between the amplitude of the breakdown and the spread caused by the breakdown on the innovation, the given number of incrementations of the Kalman filter corresponds to a duration less than a predetermined detection period, estimation of the amplitude of the breakdown of given type is made on the sliding estimation window by a minimisation method by the least-squares method or else by a Kalman filter, estimation of the impact of the breakdown on the hybrid navigation solution comprises determination, by the Kalman filter, of a dynamic navigation matrix, and estimation of an amplitude and covariance of the breakdown of given type on a sliding estimation window corresponding to a given number of incrementations of the Kalman filter, the dynamic navigation matrix representing a link between the amplitude of the breakdown and the spread caused by the breakdown on the hybrid navigation solution, two probability ratios are determined for each satellite, one ratio being associated with a hypothetical breakdown of bias type and the other ratio being associated with a hypothetical breakdown of ramp type, if a breakdown of bias type is declared during the declaration step, the estimation step of the impact of the breakdown on the hybrid navigation solution is conducted on a sliding estimation window from the moment of declaration of the breakdown of bias type, if a breakdown of ramp type is declared, the estimation step of the impact of the breakdown on the hybrid navigation solution is conducted on the sliding estimation window preceding the moment of declaration of the breakdown of ramp type, and if several sums of probability ratios are greater than their associated threshold value, a single breakdown is declared during the declaration step, said breakdown corresponding to the greater of the sums of probability ratios.

The invention proposes according to a second aspect a hybridisation device comprising a virtual platform capable of calculating inertial measurements, a Kalman filter designed to work out a hybrid navigation solution from the inertial measurements and raw measurements of signals emitted by a constellation of satellites delivered by a satellite-positioning system (GNSS), comprising:

a detection module configured to determine for each satellite at least one probability ratio between a hypothetical breakdown of a given type by ratio and a hypothetical absence of breakdown of the satellite and to declare a breakdown of given type as a function of the probability ratio associated with the breakdown of given type is of a threshold value, an accommodation module configured to estimate the impact of the declared breakdown on the hybrid navigation solution worked out by the Kalman filter, and to correct the hybrid navigation solution as a function of the estimation of the impact of the declared breakdown.

The device according to the second aspect of the invention is advantageously completed by a device for managing satellite signals configured to exclude raw measurements of signals emitted by any satellite declared in breakdown by the detection module.

The invention has numerous advantages.

The invention in particular estimates the impacts of a breakdown on the hybrid navigation solution and corrects them.

The invention detects the slow drifts by statistical tests on a sliding window.

The invention also differentiates breakdown detection of bias type and breakdown of ramp type, and applies a correction as a consequence.

Also, the invention favours detection of breakdowns within a period less than a predetermined detection period.

PRESENTATION OF THE FIGURES

Other aspects, aims and advantages of the present invention will emerge more clearly from the following detailed description of preferred embodiments of the latter, given by way of non-limiting example and in reference to the attached FIG. 1, which is a diagram illustrating a possible embodiment of a device according to the second aspect of the invention.

DETAILED DESCRIPTION

In reference to FIG. 1, this shows a hybridisation device 1 in keeping with a possible embodiment of the second aspect of the invention, designed to be embedded within a carrier such as an aircraft. The hybridisation device 1 utilises information provided by a UMI inertial unit and by a GNSS satellite navigation system, and also comprises a virtual platform 2 and a Kalman filter 3.

The virtual platform 2 receives inertial increments originating from sensors (gyroscopes, accelerometers) of the inertial unit. The inertial increments correspond especially to angular increments and to speed increments. Information on inertial navigation (such as attitudes, speed or position of the carrier) is calculated by the virtual platform 2 from these increments. This information on inertial navigation is designated as PPVI inertial measurements hereinbelow.

These PPVI inertial measurements are transmitted to a device for calculating pseudo-distances estimated a priori (not shown in FIG. 1) which also receives data on the position of the satellites. The device for calculating pseudo-distances estimated a priori calculates pseudo-distances a priori between the carrier and the different satellites visible from the carrier from some of the inertial measurements and from others by data on the position of the satellites.

The hybridisation device 1 also receives from the GNSS satellite navigation system the pseudo-measurements between the carrier and the different visible satellites. The spreads (called observations) between the pseudo-measurements estimated a priori and the pseudo-measurements delivered by the GNSS system are calculated conventionally. The hybridisation device 1 also comprises a Kalman filter 3 executing hybridisation between the inertial information originating from the inertial unit and information from the satellite navigation system. Apart from a function for supplying statistical information on the measurements at output, the role of the filter is to maintain the virtual platform 2 in a field of linear image operation of that modelled in the Kalman filter 3 by estimating a state vector dXO.

The Kalman filter 3 takes into account all observations (and to do this receives all measurements coming from the GNSS system) and works out a hybrid navigation solution.

Within the scope of the closed-loop architecture illustrated in FIG. 1 the hybridisation device 1 devises an Xref hybrid output ("Reference navigation") corresponding to the PPVI inertial measurements calculated by the virtual platform 2 and corrected via a subtractor 7 by a dXO state vector worked out by the Kalman filter.

The invention is not however limited to such architecture, but extends to open-loop architecture in which the subtractor 7 is not active.

To devise the hybrid navigation solution, the device 1 comprises a summer 10 positioned at the output of the Kalman filter 3 for adding the Xref output hybrid to the dXO state vector devised by the filter.

It is evident that the output hybrid Xref serves internally only. This is the information delivered at output of the summer 10 which provide the optimal navigation solution.

The Xref output hybrid can be relooped to the input of the virtual platform 2.

Also, as is illustrated in FIG. 1, the dXO state-stabilisation vector can be applied to the input of the Kalman filter 3.

In this way, the filter is kept consistent with the virtual platform 2.

Hereinbelow, a satellite in breakdown is defined as being a satellite which sends incorrect information in its message, leading to a spread (fixed or variable) between its real position and the position given in its message.

The hybridisation device 1 according to the invention comprises a module 4 for detection and exclusion of satellite breakdowns comprising a detection module 41 configured to conduct the steps of:
  determination, for each satellite, of at least one Ir, Ir' probability ratio between a hypothetical breakdown of a given type of the satellite and a hypothetical absence of breakdown of the satellite,
  declaration, of a breakdown of given type on a satellite as a function of the Ir, Ir' probability ratio associated with this breakdown and a threshold value.

A probability ratio is representative of the probability that the breakdown of given type with which it is associated affects the corresponding satellite. For example, if a probability ratio associated with a breakdown of given type is positive, it is more probable that said breakdown affects the corresponding satellite. The greater the probability ratio, the greater the probability that its corresponding satellite is corrupted by the breakdown with which it is associated.

Advantageously, for each satellite, at least one Ir, Ir' probability ratio is determined at each incrementation of the Kalman filter on a sliding storage window, and a breakdown of given type is declared if the sum of the probability Ir, Ir' ratio associated with this breakdown on the sliding window is greater than the associated threshold value.

The threshold value can be the same for several satellites and/or for several kinds of breakdown, or else the threshold values can be different for each satellite and for each kind of breakdown, in which case each probability ratio or advantageously each sum of probability ratios can is compared to a threshold value which is particular thereto.

The size of the sliding storage window can vary as a function of the type of the breakdown, or else a single size of sliding window can be provided.

As will be explained in detail hereinbelow, the module 4 for detection and exclusion of satellite breakdowns also utilises a function for management and exclusion of GNSS measurements for monitoring.

In the embodiment illustrated in FIG. 1, the module 4 for detection and exclusion also comprises a module 42 for managing satellite signals which receives the GNSS measurements and routes this information to the Kalman filter 3 as a function of the circumstances (no satellite detected as being faulty; exclusion of a satellite detected as being faulty).

The hybridisation device according to the second aspect of the invention also comprises an accommodation module 5 designed to carry out the steps of:
  estimation of the impact of a breakdown on the hybrid navigation solution worked out by the Kalman filter 3, and
  if a breakdown is declared, correction of the hybrid navigation solution as a function of the estimation of the impact of the breakdown.

The function of the accommodation module 5 is to evaluate the spread caused by a breakdown on the hybrid navigation solution and to correct the hybrid navigation solution, for example by way of a subtractor 6. The invention is not however limited to this architecture and the impact of the breakdown on the hybrid navigation solution can be estimated alternatively by the Kalman filter, by the detection module 41, or by any other adapted means known to the expert.

Calculation methods developed by the applicant for determining the probability ratios and the impact of a breakdown on the hybrid navigation solution will now be described. These formulae are given by way of illustration and in no way constitute a limitation of the invention.

Advantageously, an input of the detection module 41 is connected to an output of the Kalman filter, and the probability ratios are determined as a function of data provided by the Kalman filter comprising in particular an innovation vector and innovation covariances, and from an estimation vector of the impact of the breakdown of given type on the innovation vector.

Innovation means a spread between an observation a priori provided to the Kalman filter and an estimation a posteriori of this observation worked out by the filter.

The innovation vector therefore represents an innovation on the observations obtained by several satellites.

Preferably, the Ir probability ratio associated with a breakdown of given type is determined, at a given moment, by the following formula:

$$Ir_1 = \epsilon_t^T S_t^{-1} \epsilon_t - (\epsilon_t - \rho_t)^T S_t^{-1} (\epsilon_t - \rho_t)$$

in which:
  $\epsilon_t$ represents the innovation vector of the Kalman filter at the moment t
  $S_t$ represents the covariances of the innovations at the moment t, and
  $\rho_t$ represents the spread due to the breakdown on the innovation vector at the moment t.
  $^T$ represents the transposition of a matrix or of a column vector.
  $\rho_t$ is unknown, but it can be estimated on a sliding estimation window. Preferably, the spread due to the breakdown on the hybrid navigation solution is estimated in parallel, a spread which will be seen βt hereinbelow.

These estimations can be implemented according to the following formulae:

$$\rho_t = \phi_t^T \hat{v}_t$$

$$\beta_t = \mu_t^T \hat{v}_t$$

in which:
$\hat{v}_t$ is an estimation of the amplitude of the breakdown,
$\phi_t$ is a dynamic innovation matrix, representing a link between the amplitude of the breakdown and the spread caused by the breakdown on the innovation, and
$\mu_t$ is a dynamic navigation matrix, representing a link between the amplitude of the breakdown and the spread caused by the breakdown on the hybrid navigation solution.

The two dynamic matrices at the moment t are advantageously calculated by the detection module 41 from data provided by the Kalman filter, preferably cross recursively, that is, for any moment t, $\phi_t$ and $\mu_t$ are calculated as a function of $\phi_{t-1}$ and $\mu_{t-1}$.

Said data provided by the Kalman filter 3 can comprise a Kalman gain, and transition and observation matrices.

The amplitude of the breakdown is advantageously estimated on a sliding estimation window corresponding to a given number N of incrementations of the Kalman filter.

According to an advantageous variant, the estimation can be done by estimation by the least-squares method on the sliding estimation window, preferably by the following formula:

$$\hat{v}_t = (\Sigma_{i=t-N+1}^{t} \phi_i S_i^{-1} \phi_i^T)^{-1} \cdot (\Sigma_{i=t-N+1}^{t} \phi_i S_i^{-1} \epsilon_i)$$

Advantageously, the given number N of incrementations of the Kalman filter corresponds to a duration lasting less than a predetermined detection period T. In particular, in noting $\delta$ the period of incrementation of the Kalman filter 3, the sliding estimation window must verify: $N.\delta \leq T$.

This sliding estimation window is advantageously the same as the sliding storage window of the probability ratios associated with the breakdown.

This detection period restricts the size of the sliding window and limits the calculation load.

Preferably, the detection module 41 is capable of storing the probability ratios of each satellite and for each breakdown of given type on the sliding storage window.

According to an advantageous variant, two Ir, Ir' probability ratios are determined for each satellite, a Ir ratio being associated with a hypothetical breakdown of bias type and the other Ir' ratio being associated with a hypothetical breakdown of ramp type.

In particular, the dynamic innovation matrix determined for each incrementation of the Kalman filter is different for a breakdown of bias or ramp type. For each satellite, the two Ir, Ir' probability ratios are therefore different.

The invention differentiates the occurrence of a breakdown of bias type or else of a breakdown of ramp type.

If a breakdown of bias type is detected, the estimation step of the impact of the breakdown on the hybrid navigation solution is advantageously done on a sliding estimation window from the moment of declaration of the breakdown of bias type. In this way, if a breakdown of bias type is detected, the sliding estimation window is left active over a determined period sufficient for estimating the characteristics of the breakdown.

Advantageously, estimation of the characteristics of the breakdown of bias type is a function of the moment of appearance of the breakdown, that is, of the moment where the sum of the probability ratios on the sliding storage window associated with the breakdown of bias type has exceeded its associated threshold value. The exclusion of measurements by the device 42 is implemented only after this estimation.

If a breakdown of ramp type is detected, the estimation of the impact of the breakdown on the hybrid navigation solution is preferably done on the sliding estimation window preceding the moment of declaration of the breakdown of ramp type.

Advantageously, if several sums of Ir, Ir' probability ratios are greater than their associated threshold value, a single breakdown is declared by the detection module 41. This breakdown corresponds to the greater of the sums of probability ratios for all the breakdowns contemplated over all satellites.

In this way, if two satellites are likely to be declared in breakdown, only the more probable breakdown is effectively declared and if two breakdowns of different types are likely to be declared, only the more probable breakdown is effectively declared.

The invention claimed is:

1. A process for determination of navigation parameters of a carrier by a hybridisation device comprising a Kalman filter (3) working out a hybrid navigation solution from inertial measurements calculated by a virtual platform (2) and raw measurements of signals emitted by constellations of satellites delivered by a satellite-positioning system (GNSS), comprising the steps of:
   determination for each satellite of at least one (Ir, Ir') probability ratio between a hypothetical breakdown of a given type of the satellite and a hypothetical absence of breakdown of the satellite,
   declaration of a breakdown of given type on a satellite as a function of the (Ir, Ir') probability ratio associated with this breakdown and a threshold value,
   estimation of an impact of the declared breakdown on the hybrid navigation solution, and
   correction of the hybrid navigation solution as a function of the estimation of the impact of the declared breakdown.

2. The process as claimed in claim 1, in which for each satellite at least one (Ir, Ir') probability ratio is determined at each incrementation of the Kalman filter on a sliding storage window, a breakdown of given type being declared when the sum of the (Ir, Ir') probability ratios associated with this breakdown is greater than the associated threshold value.

3. The process as claimed in claim 2, also comprising, when a breakdown is declared, a step of exclusion of raw measurements of signals emitted by the satellite declared in breakdown.

4. The process as claimed in claims 1, 2, or 3, in which the (Ir, Ir') probability ratio is determined as a function of an innovation vector and of innovation covariances provided by the Kalman filter and from estimation of the impact of the breakdown of given type on said innovation vector.

5. The process as claimed in claim 4, in which the impact of the breakdown of given type on said innovation is estimated by determination, from data provided by the Kalman filter (3), of a dynamic innovation matrix, and estimation of the amplitude of the breakdown of given type on a sliding estimation window corresponding to a given number (N) of incrementations of the Kalman filter (3), the dynamic innovation matrix representing a link between the amplitude of the breakdown and the spread caused by the breakdown on the innovation.

6. The process as claimed in claim 5, in which the given number (N) of incrementations of the Kalman filter (3) corresponds to a duration lasting less than a predetermined detection period (T).

7. The process as claimed in claim 6, in which the estimation of the amplitude of the breakdown of given type is done on the sliding estimation window by a minimisation method by the least-squares method or else by a Kalman filter.

8. The process as claimed in claim 7, in which the estimation of the impact of the breakdown on the hybrid navigation solution comprises determination, by the Kalman filter (3), of a dynamic navigation matrix, and estimation of an amplitude and a covariance of the breakdown of given type on a sliding estimation window corresponding to a given number (N) of incrementations of the Kalman filter, the dynamic navigation matrix representing a link between the amplitude of the breakdown and the spread caused by the breakdown on the hybrid navigation solution.

9. The process as claimed in claim 8, in which two (Ir, Ir') probability ratios are determined for each satellite, a (Ir) ratio being associated with a hypothetical breakdown of bias type and the other ratio (Ir') being associated with a hypothetical breakdown of ramp type.

10. The process as claimed in claim 9, in which, when a breakdown of bias type is declared during the declaration step, the estimation step of the impact of the breakdown on the hybrid navigation solution is conducted on a sliding estimation window from the moment of declaration of the breakdown of bias type.

11. The process as claimed in claim 10, in which, when a breakdown of ramp type is declared, the estimation step of the impact of the breakdown on the hybrid navigation solution is conducted on the sliding estimation window preceding the moment of declaration of the breakdown of ramp type.

12. The process as claimed in claim 11, in which, when several sums of (Ir, Ir') probability ratios are greater than their associated threshold value, a single breakdown is declared during the declaration step, said breakdown corresponding to the greater of the sums of probability ratios.

13. A hybridisation device comprising a virtual platform (2) capable of calculating inertial measurements, a Kalman filter (3) designed to devise a hybrid navigation solution from inertial measurements and raw measurements of signals emitted by constellations of satellites delivered by a satellite-positioning system (GNSS), characterised in that it comprises:
  a detection module (41) configured to determine for each satellite at least one (Ir, Ir') probability ratio between a hypothetical breakdown of a given type by ratio and hypothetical absence of breakdown of the satellite and to declare a breakdown of given type as a function of the (Ir, Ir') probability ratio associated with the breakdown of given type is of a threshold value,
  an accommodation module (5) configured to estimate an impact of the declared breakdown on the hybrid navigation solution devised by the Kalman filter, and to correct the hybrid navigation solution as a function of the estimation of the impact of the declared breakdown.

14. The device as claimed in claim 13, also comprising a device (42) for managing satellite signals configured to exclude raw measurements of signals emitted by any satellite declared in breakdown by the detection module.

* * * * *